(12) United States Patent
Schrick

(10) Patent No.: US 7,707,974 B2
(45) Date of Patent: May 4, 2010

(54) LCD WINDOW FOR ANIMAL TRAINING DEVICE AND METHOD FOR MANUFACTURE

(75) Inventor: Steven M. Schrick, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 257 days.

(21) Appl. No.: 11/782,635

(22) Filed: Jul. 25, 2007

(65) Prior Publication Data

US 2009/0025650 A1    Jan. 29, 2009

(51) Int. Cl.
*A01K 15/02* (2006.01)

(52) U.S. Cl. .................. 119/859; 220/664; 361/679.01; 119/908

(58) Field of Classification Search ................ 220/662, 220/663, 664, 676, 3.9; 340/396.1; 119/484, 119/859, 720, 905, 856, 908; 52/292, 295, 52/272, 274, 275, 293.3, 293.1, 294; 174/51, 174/52.5, 520, 521, 523, 525, 526, 530, 540, 174/550, 560, 658; 361/679.01, 679.02, 361/679.21, 724; 310/89; 312/326, 327, 312/328, 405
See application file for complete search history.

(56) References Cited

U.S. PATENT DOCUMENTS 3,765,249 A * 10/1973 Bissell ......................... 73/201
4,558,396 A * 12/1985 Kawabata et al. ......... 455/575.1
4,582,220 A *  4/1986 Batting ........................ 220/241
5,677,679 A * 10/1997 Iwanishi ................ 340/815.69
5,867,235 A *  2/1999 Hasegawa ..................... 349/58
6,222,597 B1 *  4/2001 Muramatsu ................... 349/58
6,519,019 B2 *  2/2003 Yazawa ....................... 349/149
6,523,966 B1 *  2/2003 Satoh et al. ................. 362/601
6,897,912 B2 *  5/2005 Kawakami et al. ............ 349/61
7,081,809 B1 *  7/2006 Mix et al. ..................... 340/321
7,151,837 B2 * 12/2006 Bank et al. ................... 381/190
2002/0073932 A1 *  6/2002 Williams ...................... 119/720

* cited by examiner

*Primary Examiner*—Rob Swiatek
*Assistant Examiner*—Ebony Evans
(74) *Attorney, Agent, or Firm*—Pitts & Brittian, P.C.

(57) ABSTRACT

A housing forming a portion of an animal training device having a framing wall adapted to frame an LCD disposed internally of the housing. The framing wall defines an interior surface and a window for viewing of the LCD. A window pane is integrally formed with the window about the outer perimeter of the window and extends laterally outwardly of the perimeter of the window to overlie a portion of the inner surface of the framing wall proximate the window thereby integrating the pane with the framing wall, thereby effecting an extended seal between the pane and the framing wall and simultaneously enhancing the strength and rigidity of the framing wall. In one embodiment, the pane is integrally molded with the framing wall.

4 Claims, 6 Drawing Sheets

LCD WINDOW FOR ANIMAL TRAINING DEVICE AND METHOD FOR MANUFACTURE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to housings for animal training devices. More particularly, this invention pertains to a housing for the receiver/transmitter unit of an animal training device having an internally disposed liquid crystal display (LCD) which desirably is visible from externally of the housing.

2. Description of the Related Art

Animal training devices are known for training or other behavior control of an animal, such as a dog. Such animal training devices commonly involve communication between a handheld transmitter of a radio frequency (RF) signal and a receiver attached to a collar worn by the animal. The handheld transmitter is commonly controlled by a user, such as a trainer or owner of the animal. The receiver attached to the collar contains electronic circuitry designed to convert a received RF signal to an electrical stimulation deliverable to the animal through electrodes disposed in physical engagement with the animal.

In use of these known devices to train an animal, for example, it often becomes necessary to adjust various settings on the animal training device, such as intensity of the electrical stimulation, effective distance of communication between the transmitter and receiver, and the like. For example, when using an animal training device to train various animals of varying size, the electrical stimulation must be sufficient to gain each animal's attention without injuring the animal. Therefore, the intensity of the electrical stimulation deliverable to the animal must be adjusted to accommodate the specific animal being trained. Furthermore, some training protocols require that a single animal receive varying levels of intensity of electrical stimulation based upon the animal's behavior.

In order to assist the user in making adjustments to the animal training device, a display apparatus, such as a liquid crystal display (LCD), is often provided to one or both of a transmitter or a receiver. In the provision of an LCD in a receiver, it is known to mount the LCD within the housing of the receiver. In so doing, the housing commonly includes a window defined in a wall of the housing. Commonly, a transparent pane is provided in covering relationship to the window to allow the user to see into the housing and view the LCD. However, in such prior art devices the interface of the perimeter of the window and its associated pane is troublesome. For example, when the pane is a separate component that is fitted within the window, the association of the outer perimeter of the pane with the inner perimeter of the window often is initially less than adequate to exclude the passage of water, high-humidity air, dust or even debris into the interior of the housing. Even where the pane is initially installed within the window such as to be sufficient to exclude liquids, dust particles, or the like from the interior of the housing, by reason of the nature of use of the training device, it has been found that the relationship of the pane to the window deteriorates to the extent that liquid, dust or the like can pass into the interior of the housing between the aligned perimeters of the window and the pane. Thus, in the prior art, as an animal wearing such a device engages in typical animal behavior, water and debris are allowed to enter the housing along the perimeter of the opening. Such entry of water and debris can cause damage to the internal workings of the receiver and is therefore undesirable.

BRIEF SUMMARY OF THE INVENTION

In accordance with one aspect of the present invention, there is provided a housing forming a portion of an animal training device. The housing includes a framing wall adapted to frame an LCD located internally of the housing. The framing wall of the present invention includes an interior surface and a window through which the LCD may be visually observed. In the present invention, the window defined within the framing wall includes a pane which is integrally formed with both the inner surface of the framing wall both in the region of the framing wall surrounding the window and extending outwardly from the inner perimeter of the window. The pane therefore fully covers the window and extends outwardly from the perimeter of the window to define a seal between the exterior and interior of the framing wall, hence between the interior and exterior of the housing.

In one embodiment, there is provided a depression in the inner planar surface of the framing wall, such depression having a through opening defining a window generally centrally thereof. In the process of forming the pane, the material employed to define the pane fills both the depression and the window opening of the depression and is integrally formed with the inner surface of the framing wall both between the respective perimeters of the window and the pane and between the framing wall and the pane. By integrating the pane with the framing wall, there is developed a unitary barrier between the exterior and interior of the housing which prohibits the ingress of liquid, dust or other undesirable substance into the interior of the housing irrespective of the environment within which the animal training takes place. Moreover, by integrating the pane with window and the framing wall surrounding the window, the pane is not subject to dislodgement during use under adverse circumstances and the framing wall is strengthened by reason of the unity of the pane with the framing wall.

One embodiment of the method of the present invention comprises the steps of: (a) providing a first mold which defines a void volume for forming a housing including a framing wall having generally planar exterior and interior opposite surfaces, within the interior surface of the first mold defining a depression, and within the depression defining a through opening leading from the exterior to the interior of the housing at a location visually proximate to a LCD disposed interiorly of the housing, (b) introducing into the void volume a quantity of a material which, when cured, defines the housing including the framing wall, (c) providing a second mold including first and second components, the first component being adapted to close off the exterior of the through opening and the second component being disposed interiorly of the housing in alignment with, and spaced apart from, the interior surface of the framing wall thereby defining a generally void volume which extends between the second component and the interior surface of the framing wall and the exteriorly closed through opening, (d) introducing into the void volume a quantity of a material, which, when cured, defines a transparent pane within the through opening, and (e) removing the second mold components and recovering the housing with its transparent integrally formed window and window pane.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
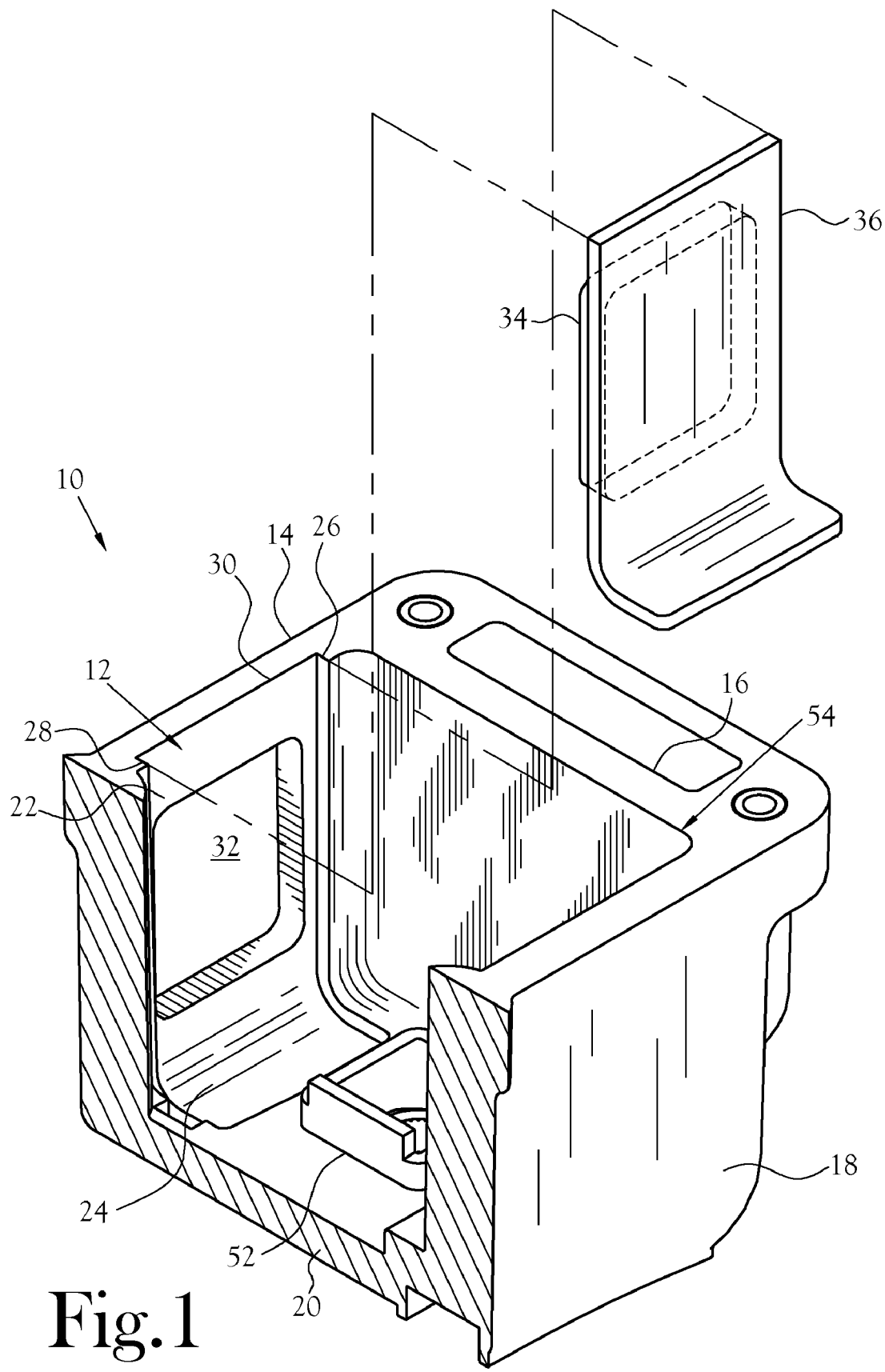
FIG. 1 is a sectional, exploded perspective view of the part of the housing incorporating a molded window of FIG. 2 taken along section line 1-1.

Referring initially to FIG. 1, there is depicted a portion of one embodiment of a housing 10 for an animal training device of the present invention. The depicted portion of the housing 10 includes first, second and third walls 14, 16, 18 which define an open void space therebetween. A first one of these walls defines a framing wall 14 forming one aspect of the present invention, whereas the remaining second and third walls 16, 18 define a portion of the geometry of the housing 10 and provide support for the framing wall 14. The housing 10 further includes a bottom wall disposed in a plane perpendicular to the several walls and defines a floor 20 for the apparatus. The top 54 of the depicted housing 10 is open for purposes referred to hereinafter.

In the embodiment depicted in FIG. 1, the framing wall 14 includes a relatively shallow void depression 12, such depression 12 having a first planar top portion 22 which is disposed within the plane of the framing wall 14 and a second bottom portion 24 which bends away from the plane of the top portion 22 of the depression 12 in a direction inwardly of the housing 10, and along a portion of the floor 20 of the housing. This depression 12 includes first and second side walls 26, 28 and is open at the top end 30 thereof.

In the embodiment depicted in FIG. 1, there is provided a void through opening which defines within the framing wall 14 an open window 32 of generally closed rectangular geometry disposed generally centrally of the top portion 22 of the depression 12. This window 32 is aligned with the line of sight of an observer located externally of the housing 10.

In accordance with one aspect of the present invention, a substantially transparent pane 34 is disposed within the window 32 and extends laterally away from the perimeter of the window 32 along an inner surface of the framing wall 14. In the embodiment depicted in FIG. 1, the pane 34 defines an integrally formed support structure 36 keyed to the top and bottom portions 22, 24 of the depression 12. The support structure 36 is disposed within the depression 12 as the pane 34 is disposed within the window 32, thereby allowing an operative engagement of the support structure 36, first and second side walls 26, 28 of the framing wall 14, and the bottom portion 24 of the depression 12 along a portion of the floor 20 to restrain the pane 34 against movement proximate the framing wall 14. In this manner, the support structure 36 extends in overlying relationship to a portion of the floor 20 of the housing 10 immediately adjacent a bottom end of the framing wall 14. In another embodiment, the pane 34 is secured in place by at least one independent fastening device, such as an adhesive and/or a plurality of screws. Those skilled in the art will recognize other fastening devices suitable to secure the pane 34 within the window 32, and such fastening devices may be used without departing from the spirit and scope of the present invention.

Figure 2:
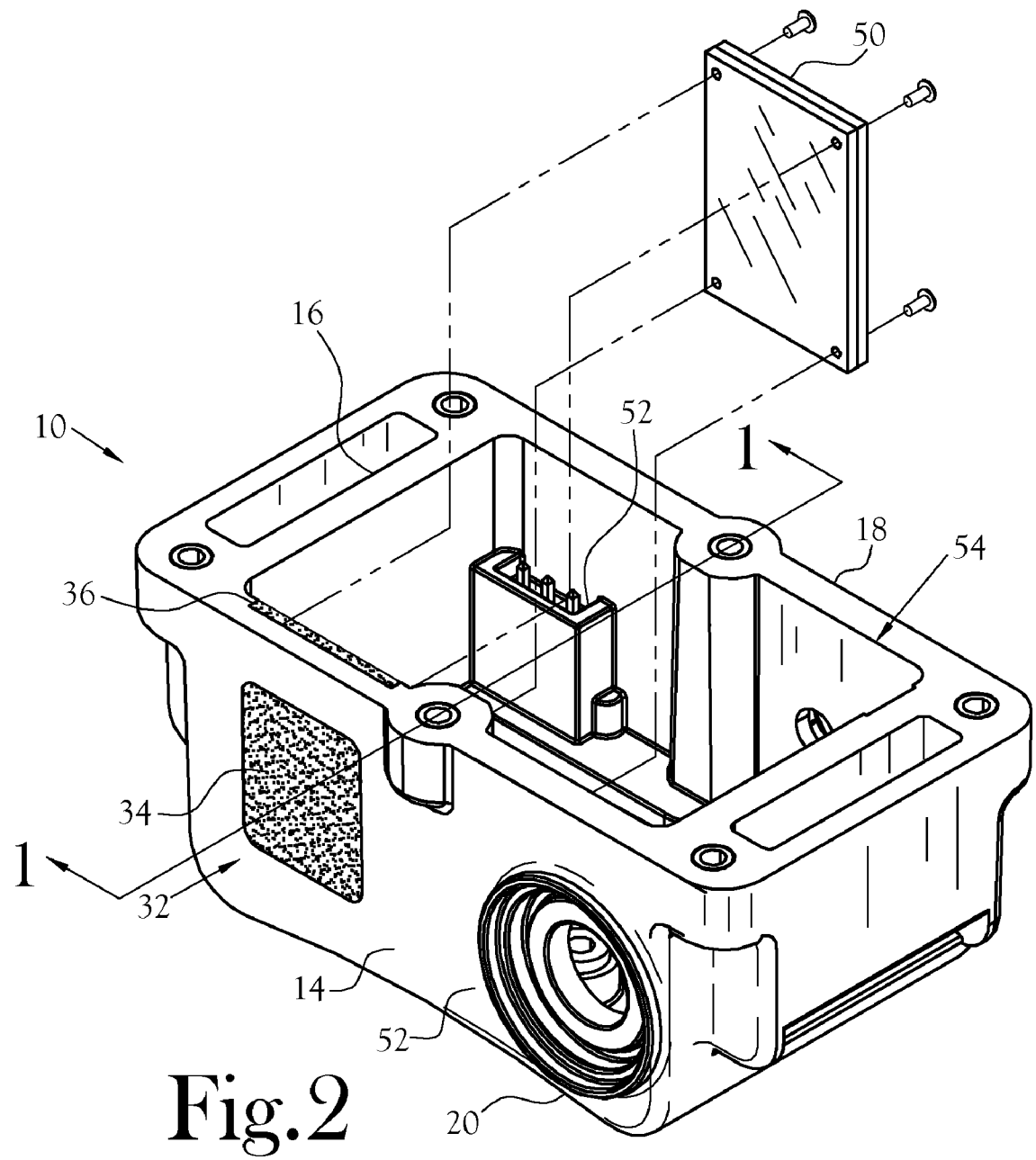
FIG. 2 is an exploded perspective view of one embodiment of one part of a two-part housing for an animal training device incorporating a molded window according to the present invention.

FIG. 2 shows a perspective view of the embodiment of the housing 10 of FIG. 1. As shown in FIG. 2, the housing 10 has a substantially transparent pane 34 closing at least the window 32 in the framing wall 14. As noted above, the top 54 of the housing 10 is open. In one embodiment of the present invention, an LCD 50 is received through the housing top 54 and mounted internally of the housing 10 proximate the framing wall 14 so as to be readily visible through the pane 34 within the field of view of an observer located externally of the housing 10. Furthermore, the housing 10 is adapted to receive other of the well known components employed in animal training devices in electrical association with the LCD 50. To this extent, the housing 10 defines various openings and voids 52, such as a power switch opening and the like, and such openings and voids 52 are adapted to carry various components of an animal training device. Following installation and configuration of the various components of the animal training device, including the LCD 50, a cover (not shown) is provided to substantially close the housing 10.

Figure 3:
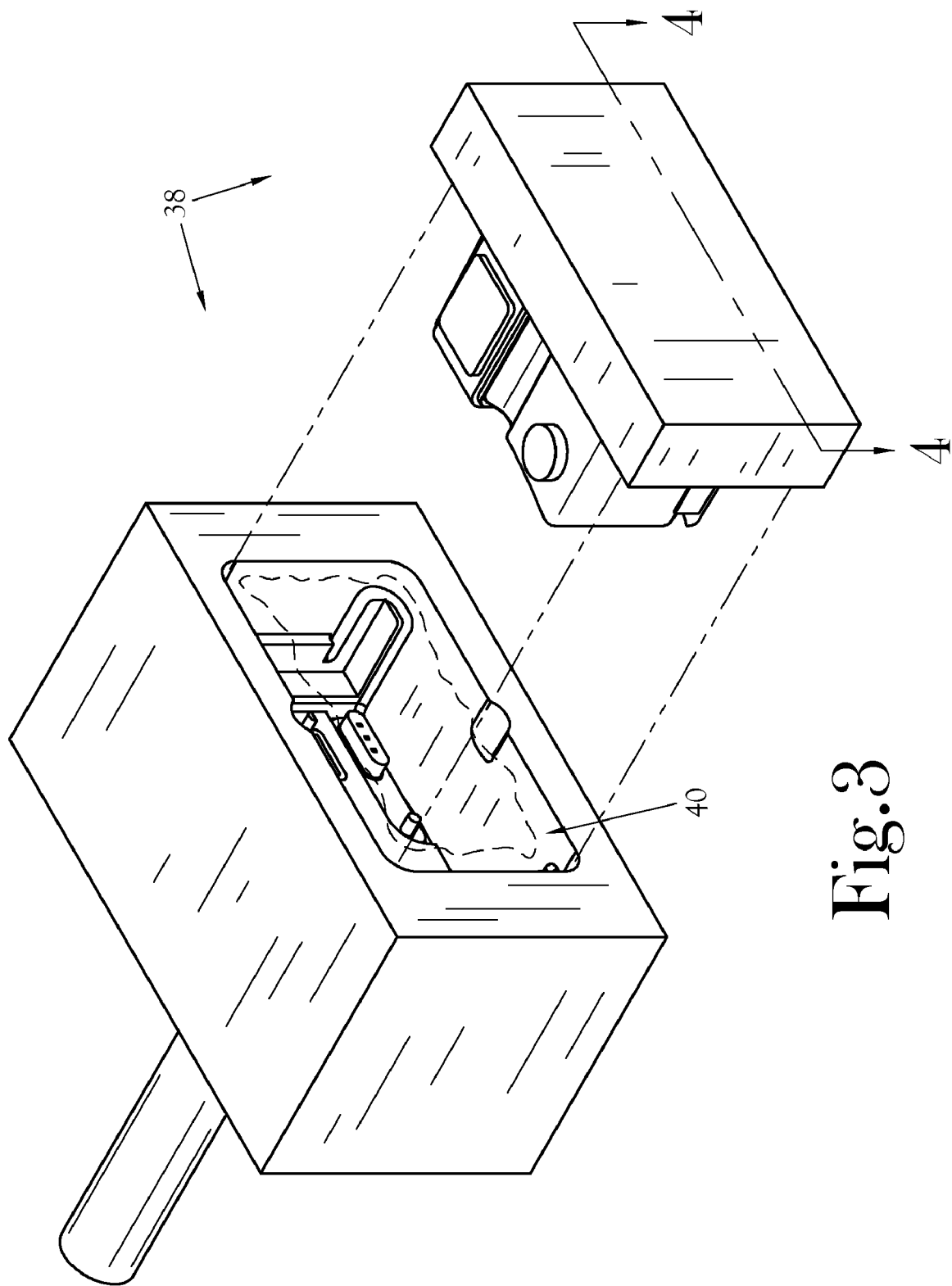
FIG. 3 is an exploded perspective view of a two-part mold for fabricating the part of the housing incorporating a molded window of FIG. 2.
Figure 4:
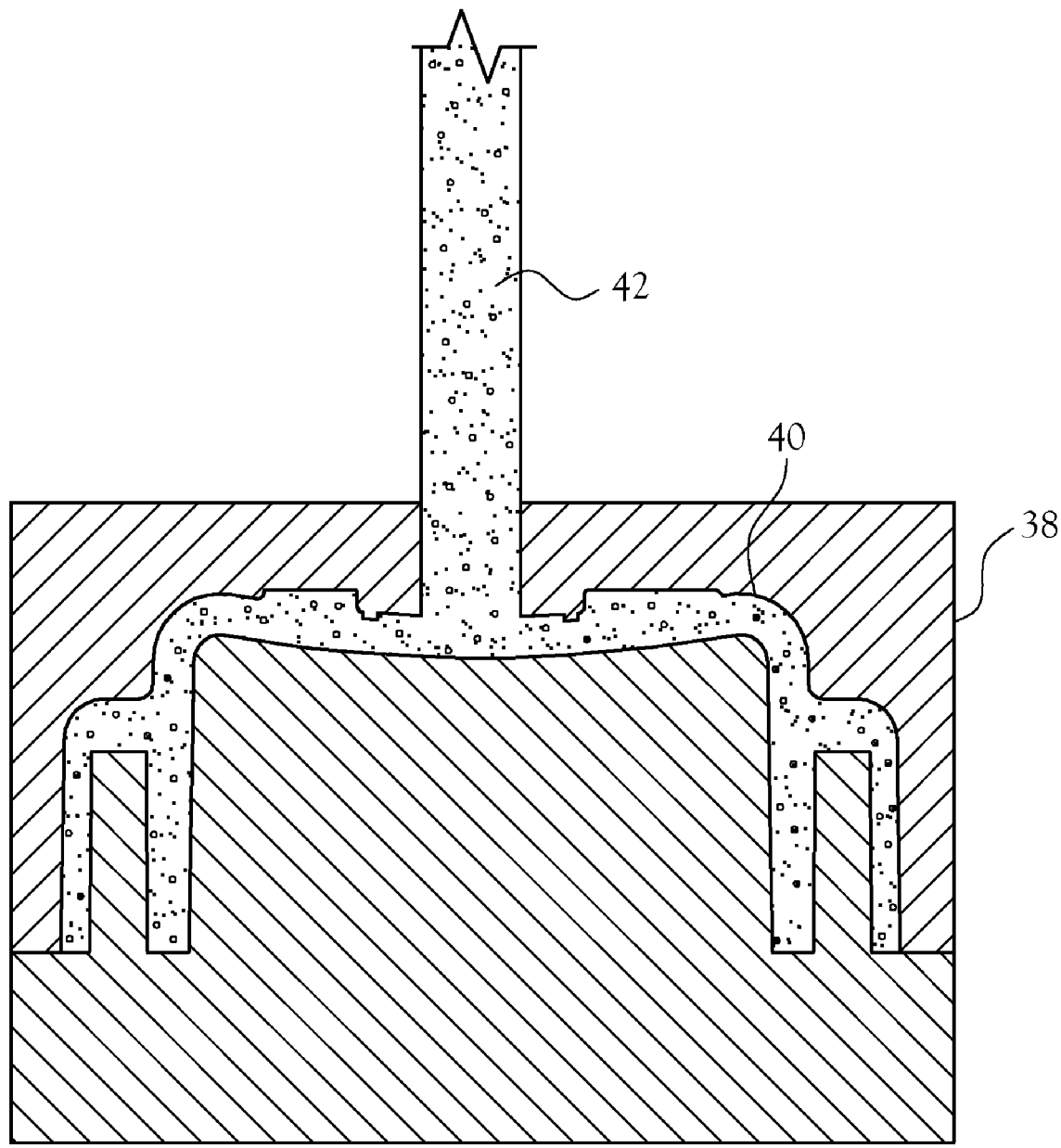
FIG. 4 is a sectional view of the assembled two-part mold taken generally along section line 4-4 of FIG. 3 and showing the injection of uncured moldable material into the assembled two-part mold.

In one embodiment of the present invention, the pane 34 is an independent element which is merely fitted within the through opening 32. In a preferred embodiment, the pane 34 is formed as an integral part of the housing 10. In this embodiment, the housing 10 is manufactured by a method as depicted in FIGS. 3-6. The method of manufacture of the housing 10 includes first molding a polymeric material to form the plurality of walls 14, 16, 18, 20 as depicted in FIGS. 1 and 2 including the depression 12 and the window 32 defined within the depression 12. Referring to FIG. 3, a first mold 38 is provided for defining a void 40 shaped and sized to conform to the plurality of walls 14, 16, 18, 20 (see FIG. 2). In FIG. 4, a cross-sectional view of the first mold 38 taken along line 4-4 of FIG. 3 is depicted. As illustrated in FIG. 4, an amount of uncured moldable material 42 is forced by an injection molding apparatus (not shown) into the void 40. The uncured moldable material is then cured, forming the plurality of walls 14, 16, 18, 20 including the depression 12 and through opening 32 within the first mold 38.

Figure 5:
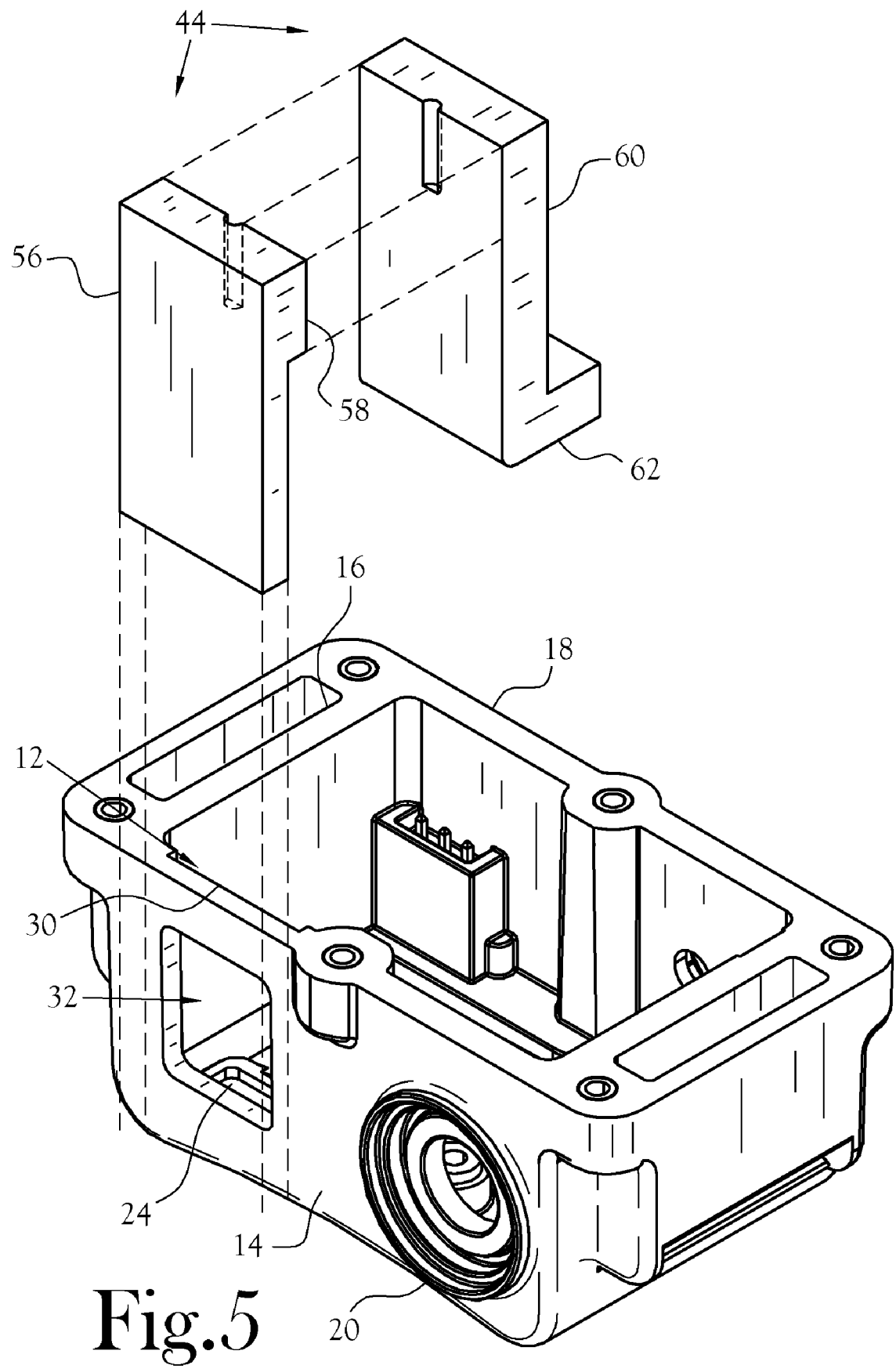
FIG. 5 is an exploded view showing a second two-part mold for fabricating the window pane and support structure exploded relative to the housing.

FIG. 5 shows the portion of the housing 10 formed in the operation described hereinabove, including the plurality of walls 14, 16, 18, 20. Referring to FIG. 5, after forming the plurality of walls 14, 16, 18, 20, at least the framing wall 14 is fitted with a two-part second mold 44. A first part 56 of the second mold 44 overlies an outer surface of the framing wall 14 and covers the open window 32. Additionally, an upper portion 58 of the first part 56 of the second mold 44 overlies the top end 30 of the depression 12 and terminates flush with an inner surface of the framing wall 14.

A second part 60 of the second mold 44 overlies the upper portion 58 of the first part 56 of the second mold 44 and the inner surface of the framing wall 14, including covering of the depression 12 and the window 32. A lower portion 62 of the second part 60 of the second mold 44 terminates at a horizontal location adjacent the floor 20 of the housing. In this configuration, the framing wall 14 cooperates with the floor 20 and the second part of the second mold 44 to define a narrow slit between the lower portion of the second part of the second mold 44 and the bottom portion 24 of the depression 12, thereby permitting the outflow of a flowable molding material into the portion of the depression 12 defined by the floor 20.

Figure 6:
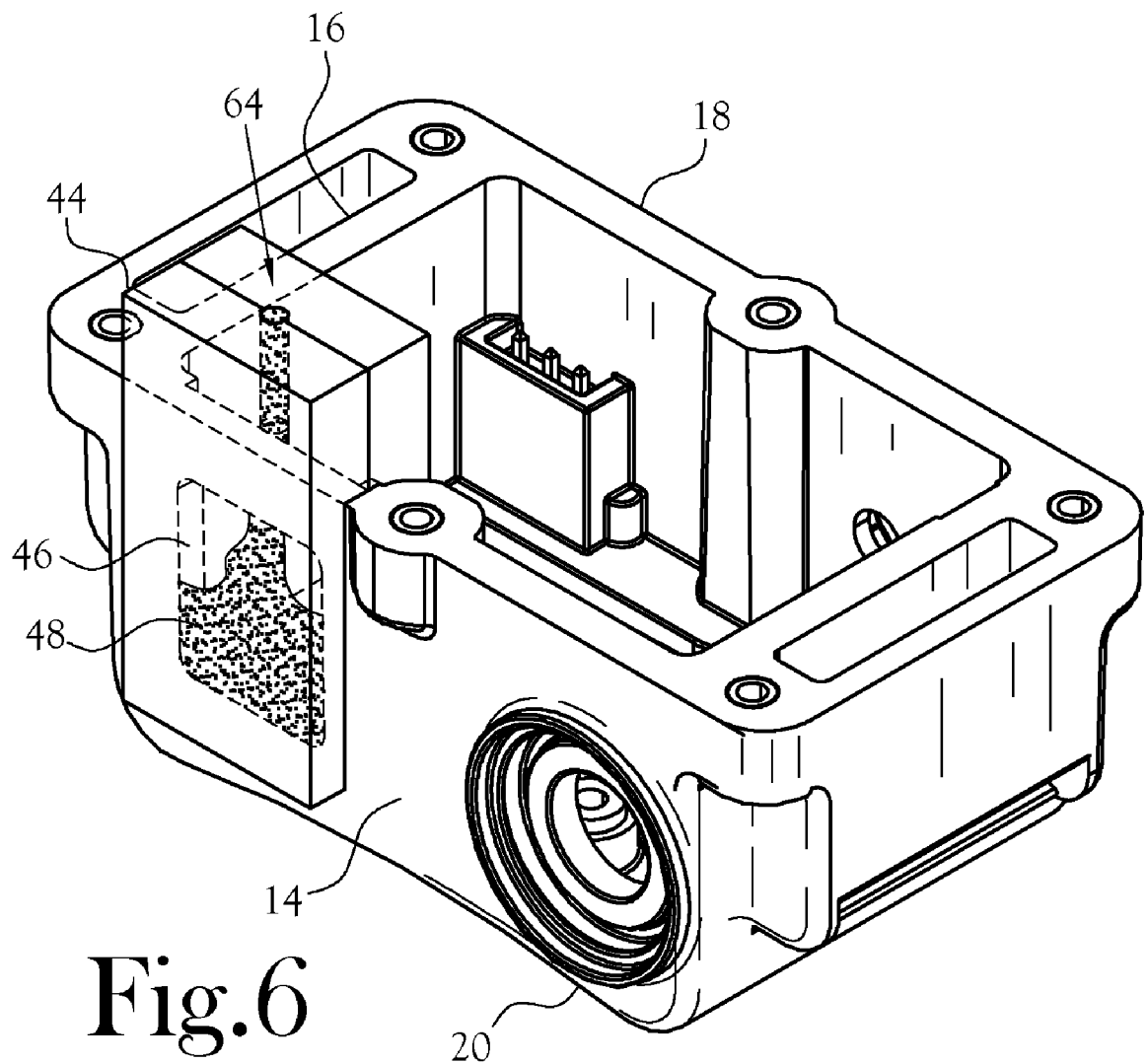
FIG. 6 is a perspective view showing the assembled second two-part mold of FIG. 5 fitted on the housing and showing the injection of transparent material within the void to form the window pane and support structure.

Referring now to FIG. 6, at the top end of the second mold 44, there is defined a sprue 64 leading from the exterior of the second mold 44 into the void depression 12 and its window 32. By these means, the second mold 44 and the plurality of walls 14, 16, 18, 20 cooperate to define a molding cavity 46 which forms the shape of the depression 12 and its window 32, i.e., the pane 34.

Formation of the pane 34 may be accomplished by injection through the sprue 64 and into the depression 12 and its window 32, an uncured, flowable, transparent material 48. When the injected transparent material 48 has cured or otherwise solidified, the first and second parts 56, 60 of the second mold 44 are removed, leaving the injected material integrally formed within the depression 12 and its window 32. In the injection process, a portion of the flowable transparent material 48 flows between the lower portion 62 of the second part 60 of the second mold 44 and the floor 20 of the housing 10. The portion of the transparent material 48 flows into overlying relationship with, and integrally bonds with, a portion of the floor 20 of the housing 10, thereby ensuring complete closure and integration of the depression 12 and both the inner wall of the framing wall 14 and that portion of the floor 20 of the housing 10 which is adjacent the terminal end of the second part 60 of the second mold 44. Moreover, in this embodiment of the invention, the extension of the molded transparent material 48 into the depression 12 and onto the floor 20 enhances the strength of the framing wall 14. Particularly, such extension of the transparent material 48 enhances the torque resistance of the framing wall 14 and aids in the retention of the pane 34 in good sealing relationship with the perimeter of the window 32.

Those skilled in the art will appreciate that the exact configuration between the second mold 44 and the plurality of walls 14, 16, 18, 20 may vary without departing from the spirit and scope of the present invention. To this extent, in another embodiment, the molding cavity 46 defined by the two-part second mold 44 takes on the form of the window 32 only, thereby integrating the injected transparent material 48 within the perimeter of the window 32.

Referring again to FIG. 2, after formation of the pane 34 within the molding cavity 46, the housing 10 is removed from the second mold 44. After manufacture of the housing 10, the pane 34 is configured to interface the framing wall 14 such as to at least integrally seal the perimeters of the pane 34 and the window 32 sufficient to protect the interior of the housing 10 against the entry of dust, moisture, debris, and the like. As noted, the molding operations of FIGS. 3-6 preferably extend the cured transparent material into, and filling, the depression 12 as well as the window 32. In either event, in the method of manufacture shown in FIGS. 3-6, the molding material 42 integrates with the polymeric material 48 of construction of the housing 10 to form a water-tight, or even air-tight, sealing of the pane 34 within the window 32. By this means, the interior of the housing 10 is protected against the entry therein of dust, moisture, debris or other unwanted substance which might be injurious to the electrical circuitry disposed within the housing 10.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A housing forming a portion of an animal training device, said housing comprising:
   a container having a plurality of walls defining a void space therebetween, one of said plurality of walls being a framing wall having an interior surface and defining a window through which an LCD may be visually observed, another of said plurality of walls defining a floor being in engagement with and substantially perpendicular to said framing wall and having an interior surface, said framing wall interior surface and said floor interior surface cooperatively defining a depression having a first portion defined by said framing wall surrounding said window and a second portion defined by said floor; and
   a pane integrally formed with said container, said pane keyed to said window and said depression, said pane having a projection occupying said window and a support structure having a first portion occupying said depression first portion and a second portion occupying said depression second portion thereby restricting movement of said pane relative to said framing wall, at least said projection and support structure first portion being visually transparent, said pane fully covering said window and defining a seal of said window between an exterior and interior of said framing wall.

2. The housing of claim 1, said housing further defining at least one opening for receiving a correction stimulation device.

3. The housing of claim 1 further defining an LCD received within said housing and mounted internally of said housing proximate said framing wall such that said LCD is at least partially visible through said window pane.

4. A housing for an animal training device, said housing comprising:
   a container including a first wall and a second wall in engagement with and substantially orthogonal to said first wall, said first wall defining a window, said first wall and said second wall cooperatively defining a depression having a first portion in said first wall around said window and a second portion in said second wall;
   a window pane substantially filling said window, said window pane being visually transparent; and
   a support structure received within said depression and secured to said container to form a seal around said window and securing said window pane within said window thereby resisting movement of said window pane relative to said window, said support structure being visually transparent where said support structure overlies said window.

* * * * *